United States Patent [19]

McLellan

[11] Patent Number: 5,603,591
[45] Date of Patent: Feb. 18, 1997

[54] SAFETY STRAPPING SYSTEM

[76] Inventor: Stephanie McLellan, 1750 Sugar Pine Dr., Corona, Calif. 91720

[21] Appl. No.: 505,616

[22] Filed: Jul. 21, 1995

[51] Int. Cl.⁶ .................................................. B60P 7/00
[52] U.S. Cl. .............................. 410/97; 410/96; 24/16 R; 24/442
[58] Field of Search .............................. 410/96, 97, 98, 410/99, 100; 24/16 R, 306, 442

[56] References Cited

U.S. PATENT DOCUMENTS

| | | | |
|---|---|---|---|
| 2,998,625 | 9/1961 | Huber | 410/97 |
| 3,000,384 | 9/1961 | Piers, Jr. | |
| 3,372,438 | 11/1966 | Rinecker | |
| 3,426,363 | 2/1969 | Girard | |
| 3,668,740 | 6/1972 | Pearson | 410/97 X |
| 4,273,130 | 6/1981 | Simpson | |
| 4,864,698 | 9/1989 | Brame | |
| 4,878,274 | 11/1989 | Patricy | |
| 4,918,790 | 4/1990 | Cirket et al. | |
| 4,963,410 | 10/1990 | Bryant | |
| 5,075,933 | 12/1991 | Kemper | 24/442 X |
| 5,086,543 | 2/1992 | Mitchell | 24/442 X |
| 5,167,050 | 12/1992 | Korsen | 24/442 X |

FOREIGN PATENT DOCUMENTS 4-63733  2/1992  Japan .................................. 410/96

Primary Examiner—Karen B. Merritt
Assistant Examiner—Stephen Gordon
Attorney, Agent, or Firm—Price, Gess & Ubell

[57] ABSTRACT

A strapping system for attaching ladders and the like to a vehicle rack is comprised of a flexible strap of fabric or plastic with a cinch ring attached to one end. One surface of the strap is covered by loop fabric of a complementary loop and hook fastening system. The other surface of the strap is covered by hook material, although the hook material is preferably restricted to a relatively short segment of the strap adjacent to the free end opposite the end bearing the cinch ring. The system is installed on the rack by encircling the rack with the strap-loop surface outward, and the free end is threaded through the ring and pulled tight. A retainer clip comprising a C-shaped spring wire attached to the ring is used to stabilize the installation on the rack. The system can be advantageously left installed on the rack between uses. A ladder, or like object, is placed on the rack and wrapped tightly with the rack-attached strap. The wrapped strap and the ladder are locked in place by pressing the hook material to the loop fabric. A brightly colored flexible tab is attached to the free end of the strap to facilitate finding and grasping the free end for peeling the hook material from the loop fabric to remove and use the ladder.

18 Claims, 2 Drawing Sheets

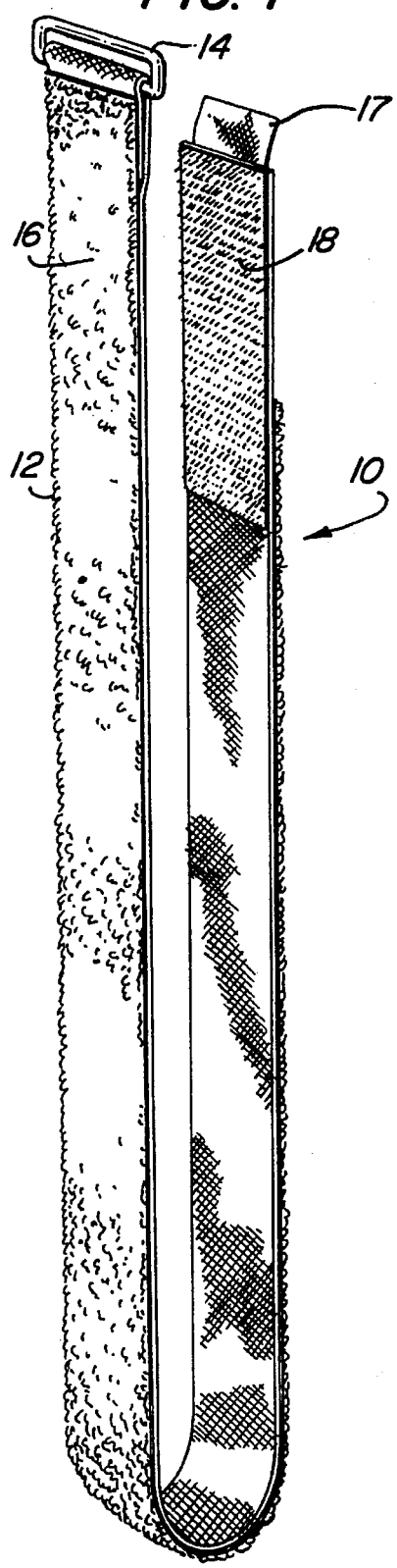
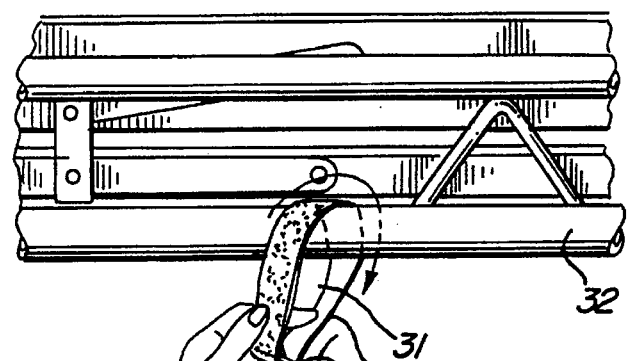
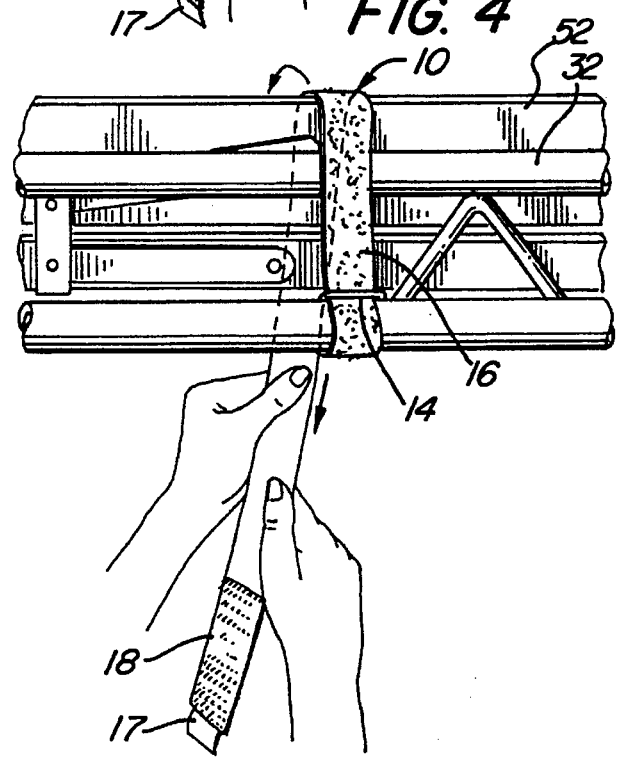

SAFETY STRAPPING SYSTEM

BACKGROUND OF THE INVENTION

1. Field of the Invention

The present invention is in the field of retaining or securing objects and, more specifically, in the field of tie-down strapping systems for removably attaching objects to overhead vehicle racks.

2. Description of Related Art

The problem of removably attaching objects such as ladders, pipes or tools to vehicles has long been a vexing one. Typically there will be some type of rack to which one fastens the ladder, tools, and construction materials, but the problem is how to removably attach these objects to the rack. The oldest method is probably to tie the objects on with a rope or cord. However, inexpert knots may readily slip, thereby depositing the ladder and materials in the middle of the freeway during rush hour. Furthermore, secure knots may be so difficult to quickly untie that one has to resort to cutting the ropes to remove the objects from the vehicle.

An alternate solution is to use an elastic "bungee" cord to hook the objects to the vehicle's rack. Although such an arrangement allows for quick attachment and quick removal, it is frequently not adequately secure. Bungee cords are unreliable and can be dangerous because if bungee cords are not applied tightly enough, the attached objects may work loose, resulting in yet another freeway incident. Still another solution is to use tie-down straps with some sort of strap fastening system such as a buckle—particularly one with serrated teeth to grip the strap. A strap threaded through the buckle and cinched down tight will generally hold tight, but one still faces the problem of ensuring that the strap is really adequately tight. If the strap becomes slack, the buckle may release, with serious consequences. Even if the buckle does not release, slackness may allow the pipes or other retained objects to simply slip off the rack.

A major improvement in fasteners has been provided by the complementary surface "hook-and-loop" fasteners such as those marketed under the trademark VELCRO.™ These fasteners work by an interaction between a loop or pile surface and a hook surface which comprises a plurality of tiny hooks capable of snagging the loops of the pile surface. The hook-and-loop interaction holds the two surfaces together and provides a significant resistance to lateral or sliding motions. However, the two surfaces can be separated relatively easily by vertically peeling them apart. At times the biggest problem may not be in fastening these systems, but in finding an end to peel them apart.

The challenge has been how to most advantageously utilize the hook-and-loop fasteners. There have been numerous inventions utilizing hook-and-loop fasteners in conjunction with straps to fasten various articles. There are a large number of different ways that hook-and-loop fasteners can be combined with straps to form strapping systems, and the precise details of the strap construction can have great effects on the success of various systems. The weight of the items to be fastened also has an important influence in that arrangements that are adequate to fasten light objects may be completely unsuitable for heavier objects.

Hook-and-loop strap systems are often produced with a ring or open buckle attached to one end of the strap. This configuration is shown in U.S. Pat. No. 3,426,363 to Girgard where a hook-and-loop strap is shown with a ring attached to one end and a region of hook fabric at the other end of the strap. On the same side of the strap as the hook fabric, loop fabric extends from the ring to the region of hook fabric. This type of strap can be removably attached to an elongate object by encircling the object with the strap, loop fabric side out, inserting the free end of the strap through the ring, and doubling it back so that the hook region adheres to the loop fabric region.

This method of use is demonstrated in U.S. Pat. No. 3,372,438 to Rinecker, U.S. Pat. No. 4,273,130 to Simpson, and U.S. Pat. No. 4,864,698 to Brame. However, this type of device is not very useful for securing heavy objects like ladders to a vehicle rack. U.S. Pat. No. 4,878,274 to Patricy extends this type of hook-and-loop strap system to mounting objects like a hammock or snow skis. This advance is obtained by adding a second ring to the end of the strap. This way, one ring can be used for doubling back the strap, as explained above, while the second ring can be used to mount an object through an S-hook or a similar attachment. However, this invention does not solve the problem of removably attaching ladders or construction material to a vehicle, since an S-hook arrangement may not adequately immobilize such items during vehicle motion.

There have also been attempts to provide a fastening system that remains attached to the fastened item. An example is found in U.S. Pat. No. 4,963,410 to Bryant. This hook-and-loop strap system is intended to aid in the storage of extension cords. The invention comprises a ring onto which is fastened two hook-and-loop straps, a short strap that has loop fabric on a first side and hook fabric on the other, and a long strap that is all loop fabric on a first side and has both a loop and a hook region of fabric on the other side, with the hook region being at the free end of the strap opposite the ring end. This device can be attached to an extension cord by passing the long strap over the cord and through the ring. The short strap is then allowed to contact the long strap, thus locking the strapping system in place on the cord. This results in the long strap dangling from the cord while the cord is in use. When the cord is looped into a bundle for storage, the long strap can then be wrapped about the bundle several times and locked in place by adhering the hook region at the free end of the long strap to the loop surface of the same strap.

OBJECTS AND SUMMARY OF THE INVENTION

It is an object of the present invention to provide a hook-and-loop strapping system especially adapted to securing items to the rack of a vehicle;

It is an additional object of the present invention to configure the strapping system so that the strap may be conveniently left in place on the vehicle rack when the secured item is removed; and It is a further object of the present invention to provide means to simplify the removal of a secured item.

These and other objects are realized in a strapping system comprising a flexible strap of fabric or plastic with a cinch ring attached to one end. One surface of the strap is covered by loop fabric of a complementary loop and hook fastening system. The other surface of the strap is covered by hook material, although the hook material is preferably restricted to a relatively short segment of the strap adjacent to the free end opposite the end bearing the cinch ring. The system is used to removably attach ladders and the like to the rack of a vehicle. The system may be advantageously left installed on the rack when the ladder is removed for use. The system is installed onto the rack by encircling the rack with the strap-loop surface outward--with the free end threaded through the ring and pulled tight. A retainer clip comprising a C-shaped device of spring wire is attached to the ring to stabilize the installation on the rack so that the strap remains tightly looped about the rack. A brightly colored flexible tab is attached to the free end of the strap to facilitate finding and grasping the free end for peeling the hook material and the loop fabric apart to remove the ladder.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 shows a perspective drawing of a strapping device of the present invention;

FIG. 3 shows an initial step in using the strapping device of the present invention;

FIG. 4 shows an intermediate step in using the strapping device of the present invention;

DETAILED DESCRIPTION OF THE PREFERRED EMBODIMENTS

Figure 2:
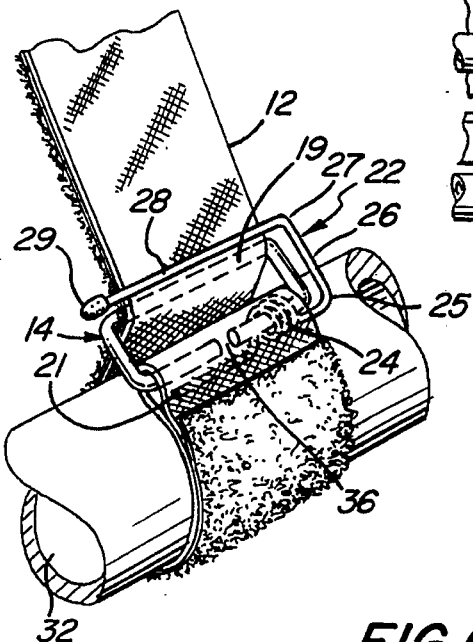
FIG. 2 shows a close-up of a retainer clip of the strapping device of the present invention.

The following description is provided to enable any person skilled in the art to make and use the invention and sets forth the best modes contemplated by the inventor of carrying out her invention. Various modifications, however, will remain readily apparent to those skilled in the art, since the generic principles of the present invention have been defined herein specifically to provide a hook-and-loop strapping system adapted to securing objects to a vehicle rack with the system configured so the strap remains on the rack between uses and provided with means for easily removing a secured object.

The basic structure a strapping system 10 of the present invention is shown in FIG. 1. An elongate strap 12 has an open ring or cinch ring 14 attached to one end by folding the strap 12 over the ring 14 and sewing the folded portion. The preferred ring 14 has an essentially rectangular shape but rings of other configurations can be used as well. While the preferred ring 14 is constructed from noncorroding metal for maximum strength, rings of other materials can be employed as well. The strap 12 itself is made of high strength woven nylon fabric. Again, other suitable strapping materials, such as plastics or leather, can be used.

A first surface of the strap 12 is completely covered by a layer of loop fabric 16 except for a relatively short length at a free end of the strap opposite the ring 14. The loop fabric 16 is preferentially attached to the strap 12 by sewing, although other bonding procedures, such as the use of adhesives, may serve as well.

A second surface of the strap 12 bears a length of hook material 18. Although all or much of the second surface can be covered by hook material 18, a more economical and easy to use strap is produced by limiting the hook material 18 to a relatively short length attached to the free end of the strap (the end not bearing the attached ring 14). The length of hook material 18 overlaps the loop fabric on the other surface of the strap 12 by about one inch so that the same stitches can serve to attach both the hook material 18 and the loop fabric 16. The hook material 18 is attached by any of the methods such as sewing or use of adhesives which are used to attach the loop fabric 16; however, sewing is the preferred method.

The end of the strap 12 that bears the hook material 18 is provided with a small removal tab 17. The tab 17 is of cloth or plastic about one-half inch long and projects beyond the end of the hook material 18. To disengage the strap 12 when it is fully engaged in holding an object, one must grasp the end of the strap 12 that bears the hook material 18 and peel the hook material 18 away from its contact with the loop fabric 16. Often it is difficult to find the free end of the strap 12. Further, it may be necessary to pry under that end with one's fingernails to obtain a good hold on the strap. These difficulties are obviated by the tab 17, which clearly defines the strap end and affords an easy grasp for peeling apart the hook material 18 and the loop fabric 16 with no danger of broken fingernails. To ensure that the tab 17 can be readily seen it preferably is of a bright color like fluorescent orange or yellow.

FIG. 3 shows an initial step of using the strapping system 10 to attach an object to a vehicle rack 32. Although the system 10 is intended for use with a vehicle rack, various other protrusions of the vehicle structure may afford adequate purchase for the system 10 and, hence, allow it to be used without an actual vehicle rack 32. The strap 12 is threaded around a portion of the rack 32 to form an encircling strap loop 31 with the loop fabric 16 facing out. The strap end bearing hook material 18 is passed through the ring 14 and pulled until the encircling loop 31 is tight. The strap 12 is not doubled back and pulled against the ring 14 but is pulled straight through the ring 14 to ensure against slippage and to place the strap 12 in a natural position for wrapping around an object to be attached to the rack 32.

No slack should remain in the strap loop 31 that encircles the vehicle rack 32. Any slack may allow the attached object to work its way loose. This is the basic installed position for the strap 12. Even when objects are not attached to the rack 32, the looped strap 12 can be left on the rack in this configuration. The dangling strap end can be looped back up and secured by adhering the hook material 18 to the loop fabric 16. Generally, the strap 12 remains looped around the rack 32 when not in use because it is virtually impossible for the whole strap to work its way back out through the ring 14.

However, it is desirable to have the strap 12 hold tightly on the rack 32 and not slide about when not used to retain an object such as a ladder or scaffold. Further more, it is convenient to know that the strap 12 is tight on the rack 32 without having to check it each time. For this reason, the strapping system 10 may be provided with a retainer clip 22 which is shown in FIG. 2. The retainer clip 22 is a generally C-shaped piece of spring wire. A spring loop 24 ( of one or more turns) is located near a first end 21 of the retainer clip 22. The spring loop 24 tensions the retainer clip 22, when installed, so that the clip 22 presses against the cinch ring 14.

As shown in FIG. 2, the spring loop 24 is sized to slip over the cinch ring 14 and be enclosed, along with the first clip end 21, within the space formed by sewing the strap 12 onto the ring 14. There are several possible methods of manufacture for placing the clip 22 on the cinch ring 14. One method is to have preformed retainer clips 22 and insert them onto each ring 14 by means of a gap 36 in each ring 14. Then the strap 12 is threaded through the ring 14 and sewn into place. Alternatively, it is possible to produce a retainer clip 22 that has only one loop to its spring loop 24. It is then possible to twist the clip 22 around the ring 14 so that the ring 14 becomes inserted into the spring loop 24. This operation is not unlike operation of certain "magic" puzzle rings that can be manipulated to attach one solid ring to another. Finally, the ring 14 can be made with a gap which is closed by compression after insertion of the clip 22 or the clip 22 can be formed, in situ, by bending a piece of spring wire around the closed ring 14.

From the spring loop 24 the retainer clip extends parallel to the ring 14 until it emerges from the folded-over portion of the strap 12. At that point the retainer clip 22 contains a first right angle bend 25 so that a portion 26 of the clip 22 parallels a side of the ring 14. A second right angle bend 27 causes the remaining top portion 28 of the retaining clip 22 to parallel a top 19 of the ring 14. This arrangement causes the retainer clip 22 to be pressed springingly against the ring 14. When the strap 12 is threaded between the top 19 of the ring and the top portion 28 of the clip 22, the clip 22 presses against the strap 12 ensuring that it does not slip after it is pulled tight on the rack 32. That end of the clip 22 can be equipped with a small bent-back portion (not illustrated) or a plastic tip 29 to allow the clip 22 to be grasped for releasing clip pressure on the strap 12 during threading or removal of the strap 12.

The retainer clip 22 can be used to stabilize the installation of the device 10 onto a vehicle rack 32. To employ the retainer clip 22 the strap 12 is held and pulled to keep the loop around the rack 32 tight. The top portion 28 of the clip 22 can be roughened or covered by a pliable tube or coating such as rubber or soft plastic to increase the friction between the clip 22 and the strap 12.

Figure 5:
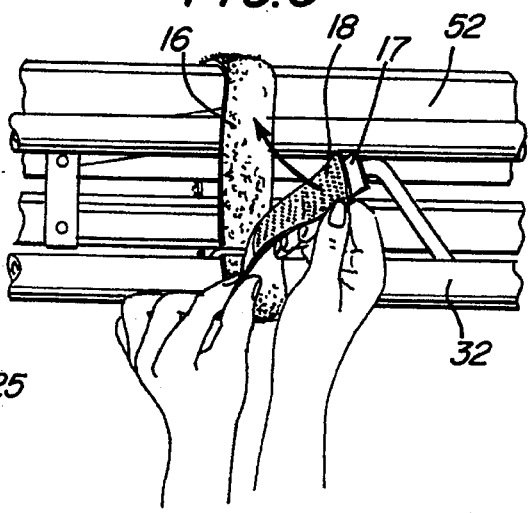
FIG. 5 show a final step in using the strapping device of the present invention.
Figure 6:
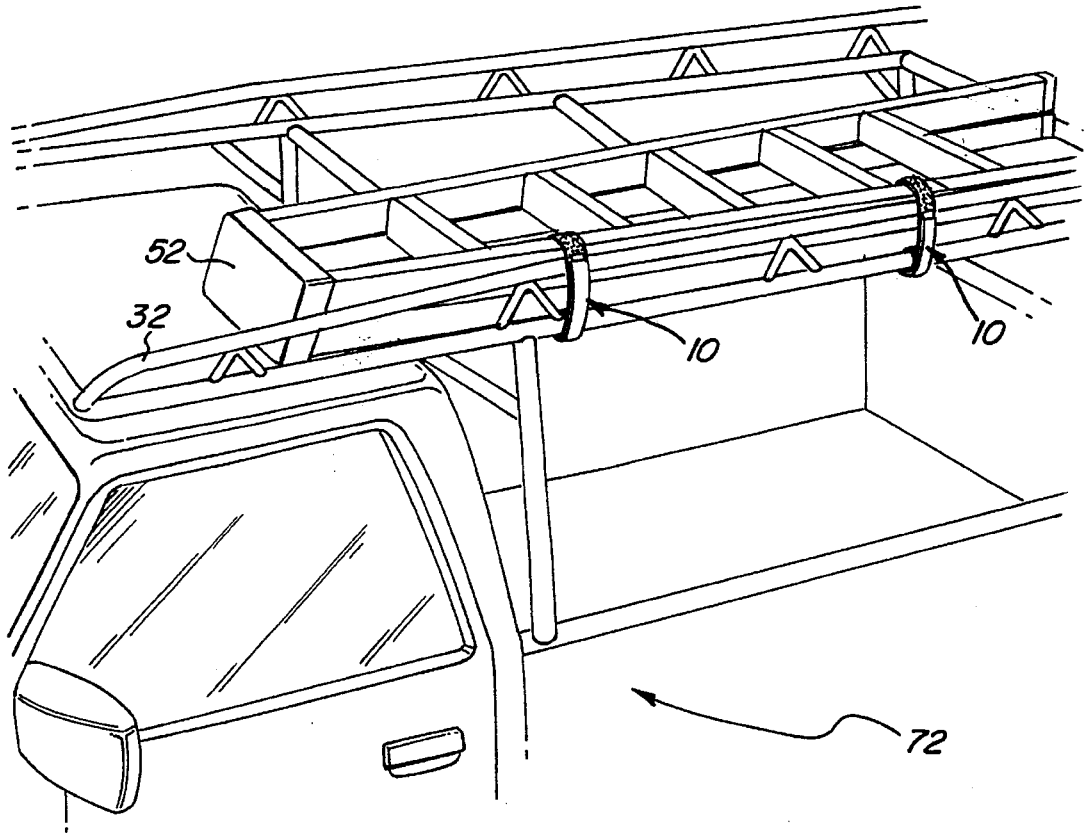
FIG. 6 shows objects attached to a vehicle rack with strapping devices of the present invention.

As shown in FIG. 5, an object such as a ladder 52 is placed on the rack 32 and the strap 12 is wound tightly round both the ladder 52 and the rack 32. Finally, the hook material 18 at the end of the strap 12 is brought into contact with the loop fabric 16 to tightly secure the entire arrangement. Note that the tab 17 clearly marks the end of the strap 12. The appearance of the device 10 used to secure the ladder 52 to the rack 32 of a vehicle 72 is shown in FIG. 6.

To remove the strapping system 10 the free end of the strap 12 is located by means of the tab 17, and the strap end or the tab 17 is grasped to peel the hook material 18 from the loop fabric 16 (the reverse of the motion illustrated in FIG. 5). Once the hook material 18 is peeled, the strap 12 can be easily unwound and the ladder 52 removed. If the retainer clip 22 has been used to secure the device 10 to the rack 32, the entire device stays firmly in place on the rack 32 waiting for its next use.

As explained above, if the retainer clip 22 is not employed, the device 10 can still be left on the rack 32 although it may have a slight tendency to loosen and shift position. To completely remove the strapping system 10, the tip 28 of the retainer clip 22 is used to hold the clip away from the ring 14 while the strap 12 is pulled through the ring 14 to release the loop 31.

Those skilled in the art will appreciate that various adaptations and modifications of the just-described preferred embodiment can be configured. without departing from the scope and spirit of the invention. Therefore, it is to be understood that, within the scope of the appended claims, the invention may be practiced other than as specifically described herein.

What is claimed is:

1. A strapping system for removably attaching objects to a rack of a vehicle, the system comprising:

an elongate strap member;

a ring attached to a first end of the strap member, the ring sized so that the strap member can freely pass through an opening of the ring; loop fabric of substantially the same width and length as the strap member attached to a first surface of the strap member with the loop fabric facing away the first surface;

hook material of substantially the same width as the strap member attached to a second surface of the strap member with the hook material facing away from the second surface; and a brightly colored tab of a different color than the elongate strap member and attached at an extreme end of a second end of the strap member for locating and peeling away the second end to release the system when the system is engaged.

2. The strapping system of claim 1, wherein the hook material is of a substantially shorter length than the strap member and occupies a region of the strap member adjacent to the second end.

3. The strapping system of claim 1, further including a substantially C-shaped retainer clip of spring wire for preventing detachment of the strapping system from the rack, the retainer clip comprising:

a first portion substantially parallel to a first side of the ring where the ring is attached to the strap member;

a second portion substantially parallel to a second side of the ring and substantially perpendicular to the first portion;

a third portion substantially perpendicular to the second portion and positioned to contact a top side, opposite the first side, of the ring; and a spring loop located between the first and second portions for springingly biasing the third portion into contact with the top side of the ring, thereby retaining the strap member when the strap member is passed between the third portion and the top side of the ring and thence through the ring to form a loop.

4. The strapping system of claim 3 further comprising a tip applied to an end of the third portion of the retainer clip, the tip for manipulating the clip to facilitate passing the strap member through the ring when forming a loop.

5. A strapping system for removably attaching objects to a rack of a vehicle, the system comprising:

an elongate strap member;

a ring attached to a first end of the strap member, the ring sized so that the strap member can freely pass through an opening of the ring;

loop fabric of substantially the same width and length as the strap member attached to a first surface of the strap member with the loop fabric facing away from the first surface;

hook material of substantially the same width as the strap member attached to a second surface of the strap member with the hook material facing away from the second surface;

a brightly colored tab of a different color than the elongate strap member and attached at an extreme end of a second end of the strap member for locating and peeling away the second end to release the system when the system is engaged; and a retainer clip for preventing the system from becoming loosened when attached to the rack without an attached object.

6. The strapping system of claim 5, wherein the hook material is of a substantially shorter length than the strap member and occupies a region of the strap member adjacent to the second end.

7. The strapping system of claim 5, wherein the retainer clip comprises a substantially C-shaped retainer clip of spring wire for preventing detachment of the strapping system from the rack, the retainer clip comprising:

a first portion substantially parallel to a first side of the ring where the ring is attached to the strap member;

a second portion substantially parallel to a second side of the ring and substantially perpendicular to the first portion;

a third portion substantially perpendicular to the second portion and positioned to contact a top side, opposite the first side, of the ring; and a spring loop located between the first and second portions for springingly biasing the third portion into contact with the top side of the ring, thereby retaining the strap member when the strap member is passed between the third portion and the top side of the ring and thence through the ring to form a loop.

8. The strapping system of claim 7 further comprising a tip applied to an end of the third portion of the retainer clip, the tip for manipulating the clip to facilitate passing the strap member through the ring when forming a loop.

9. A strapping system for removably attaching objects to a vehicle, the system comprising:

an elongate strap member;

a ring attached to a first end of the strap member, the ring sized so that the strap member can freely pass through an opening of the ring;

loop fabric of substantially the same width and length as the strap member attached to a first surface of the strap member with the loop fabric facing away from the first surface;

hook material of substantially the same width as the strap member and of substantially shorter length than the loop fabric attached to a second surface of the strap member facing away from the second surface and adjacent to a second end of the strap member;

a rack securable to the vehicle, the strap member being attached to said rack by being wrapped around the rack with the loop fabric facing away from the rack with a second end of the strap member threaded through the ring; and a brightly colored tab of a different color than the elongate strap member and attached to an extreme end of the second end of the strap member for locating and peeling away the second end to release the system when the system is engaged.

10. The strapping system of claim 9, wherein the hook material is of a substantially shorter length than the strap member and occupies a region of the strap member adjacent to the second end.

11. The strapping system of claim 9, further including a substantially C-shaped retainer clip of spring wire for preventing detachment of the strapping system from the rack, the retainer clip comprising:

a first portion substantially parallel to a first side of the ring where the ring is attached to the strap;

a second portion substantially parallel to a second side of the ring and substantially perpendicular to the first portion;

a third portion substantially perpendicular to the second portion and positioned to contact a top side, opposite the first side, of the ring; and a spring loop located between the first and second portions for springingly biasing the third portion into contact with the top side of the ring, thereby retaining the strap member when the strap member is passed between the third portion of the clip and the top side of the ring and thence through the ring to form a loop.

12. The strapping system of claim 11 further comprising a tip applied to an end of the third portion of the retainer clip, the tip for manipulating the clip to facilitate passing the strap member through the ring when forming a loop.

13. A strapping system for removably attaching objects to a rack of a vehicle, the system comprising:

an elongate strap member;

a ring attached to a first end of the strap member, the ring sized so that the strap member can freely pass through an opening of the ring;

loop fabric of substantially the same width and length as the strap member attached to a first surface of the strap member with the loop fabric facing away from the first surface;

hook material of substantially the same width as the strap member attached to a second surface of the strap member with the hook material facing away from the second surface;

a substantially C-shaped retainer clip of spring wire for preventing detachment of the strapping system from the rack, the retainer clip comprising:

a first portion substantially parallel to a first side of the ring where the ring is attached to the strap member;

a second portion substantially parallel to a second side of the ring and substantially perpendicular to the first portion;

a third portion substantially perpendicular to the second portion and positioned to contact a top side, opposite the first side, of the ring; and a spring loop located between the first and second portions for springingly biasing the third portion into contact with the top side of the ring, thereby retaining the strap member when the strap member is passed between the third portion and the top side of the ring and thence through the ring to form a loop; and a tab attached to a second end of the strap member for locating and peeling away the second end to release the system when the system is engaged.

14. The strapping system of claim 13 further comprising a tip applied to an end of the third portion of the retainer clip, the tip for manipulating the clip to facilitate passing the strap member through the ring when forming a loop.

15. A strapping system for removably attaching objects to a rack of a vehicle, the system comprising:

an elongate strap member:

a ring attached to a first end of the strap member, the ring sized so that the strap member can freely pass through an opening of the ring;

loop fabric of substantially the same width and length as the strap member attached to a first surface of the strap member with the loop fabric facing away from the first surface;

hook material of substantially the same width as the strap member attached to a second surface of the strap member with the hook material facing away from the second surface;

a tab attached to a second end of the strap member for locating and peeling away the second end to release the system when the system is engaged; and a substantially C-shaped retainer clip for preventing the system from becoming loosened when attached to the rack without an attached object comprising:
- a first portion substantially parallel to a first side of the ring where the ring is attached to the strap member;
- a second portion substantially parallel to a second side of the ring and substantially perpendicular to the first portion;
- a third portion substantially perpendicular to the second portion and positioned to contact a top side, opposite the first side, of the ring; and
- a spring loop located between the first and second portions for springingly biasing the third portion into contact with the top side of the ring, thereby retaining the strap member when the strap member is passed between the third portion and the top side of the ring and thence through the ring to form a loop.

16. The strapping system of claim 15 further comprising a tip applied to an end of the third portion of the retainer clip, the clip for manipulating the clip to facilitate passing the strap member through the ring when forming a loop.

17. A strapping system for removably attaching objects to a vehicle, the system comprising:
- an elongate strap member;
- a ring attached to a first end of the strap member, the ring sized so that the strap member can freely pass through an opening of the ring;
- loop fabric of substantially the same width and length as the strap member attached to a first surface of the strap member with the loop fabric facing away from the first surface;
- hook material of substantially the same width as the strap member and of substantially shorter length than the loop fabric attached to a second surface of the strap member facing away from the second surface and adjacent to a second end of the strap member;
- a rack securable to the vehicle, the strap member being attached to said rack by being wrapped around the rack with the loop fabric facing away from the rack with a second end of the strap member threaded through the ring;
- a substantially C-shaped retainer clip of spring wire for preventing detachment of the strapping system from the rack, the retainer clip comprising:
  - a first portion substantially parallel to a first side of the ring where the ring is attached to the strap;
  - a second portion substantially parallel to a second side of the ring and substantially perpendicular to the first portion;
  - a third portion substantially perpendicular to the second portion and positioned to contact a top side, opposite the first side, of the ring; and
  - a spring loop located between the first and second portions for springingly biasing the third portion into contact with the top side of the ring, thereby retaining the strap when the strap member is passed between the third portion of the clip and the top side of the ring and thence through the ring to form a loop; and a tab attached to the second end of the strap member for locating and peeling away the second end to release the system when the system is engaged.

18. The strapping system of claim 17 further comprising a tip applied to an end of the third portion of the retainer clip, the tip for manipulating the clip to facilitate passing the strap member through the ring when forming a loop.

* * * * *